(12) United States Patent
Kasai

(10) Patent No.: US 10,457,350 B2
(45) Date of Patent: Oct. 29, 2019

(54) BICYCLE CONTROL SYSTEM

(71) Applicant: Shimano Inc., Sakai, Osaka (JP)

(72) Inventor: Yoshiyuki Kasai, Osaka (JP)

(73) Assignee: Shimano Inc., Osaka (JP)

(*) Notice: Subject to any disclaimer, the term of this patent is extended or adjusted under 35 U.S.C. 154(b) by 217 days.

(21) Appl. No.: 14/696,591

(22) Filed: Apr. 27, 2015

(65) Prior Publication Data

US 2016/0311500 A1    Oct. 27, 2016

(51) Int. Cl.
| | |
|---|---|
| *B62M 6/45* | (2010.01) |
| *B62K 25/28* | (2006.01) |
| *B62M 25/08* | (2006.01) |
| *B62K 23/02* | (2006.01) |
| *B62J 1/08* | (2006.01) |
| *B62M 25/00* | (2006.01) |
| *B62K 25/04* | (2006.01) |

(52) U.S. Cl.
CPC .............. *B62M 6/45* (2013.01); *B62K 23/02* (2013.01); *B62K 25/28* (2013.01); *B62M 25/08* (2013.01); *B62J 2001/085* (2013.01); *B62K 2025/044* (2013.01); *B62K 2208/00* (2013.01); *B62M 2025/003* (2013.01); *B62M 2025/006* (2013.01)

(58) Field of Classification Search
CPC ............. B62J 1/08; B62J 2001/085; B62J 2099/0013; B62M 6/45; B62M 6/90; B62M 25/08
See application file for complete search history.

(56) References Cited

U.S. PATENT DOCUMENTS

| | | | |
|---|---|---|---|
| 5,213,548 A * | 5/1993 | Colbert | B62M 25/08 280/238 |
| 6,204,775 B1 | 3/2001 | Kubacsi | |
| 6,418,797 B1 * | 7/2002 | Ambrosina | B62M 6/40 73/862.29 |
| 7,381,142 B2 | 6/2008 | Campagnolo | |
| 8,271,058 B2 | 9/2012 | Rhee et al. | |
| 8,655,561 B2 | 2/2014 | Kitamura | |
| 8,721,495 B2 | 5/2014 | Kitamura et al. | |
| 8,874,338 B2 | 10/2014 | Miglioranza | |
| 8,909,424 B2 | 12/2014 | Jordan et al. | |
| 9,919,616 B2 * | 3/2018 | Watarai | B60L 15/20 |

(Continued)

FOREIGN PATENT DOCUMENTS

| | | |
|---|---|---|
| CN | 202758480 U | 2/2013 |
| EP | 1 103 456 A2 | 5/2001 |
| EP | 2 719 616 A2 | 4/2014 |

*Primary Examiner* — Jelani A Smith
*Assistant Examiner* — Donald J Wallace
(74) *Attorney, Agent, or Firm* — Global IP Counselors, LLP

(57) ABSTRACT

A bicycle control system is basically provided with a power supply, a first bicycle electric component and a controller. The first bicycle electric component is electrically connected to the power supply to receive electrical power from the power supply. The controller is programmed to monitor an electrical communication of the first bicycle electric component. The controller is further programmed to stop electrical power from the power supply to the first bicycle electric component upon determining no electrical communication to or from the first bicycle electric component for a first predetermined inactivity period.

18 Claims, 10 Drawing Sheets

(56) References Cited

U.S. PATENT DOCUMENTS

| | | | | |
|---|---|---|---|---|
| 2003/0197488 A1* | 10/2003 | Hulvey | ................ | G06F 1/3203 |
| | | | | 320/135 |
| 2004/0097265 A1* | 5/2004 | Cadieux | ................ | G06F 1/3203 |
| | | | | 455/557 |
| 2005/0143145 A1 | 6/2005 | Maekawa | | |
| 2008/0266455 A1* | 10/2008 | Kim | .................... | H04L 12/2803 |
| | | | | 348/552 |
| 2009/0102628 A1* | 4/2009 | Takebayashi | .......... | B62M 25/08 |
| | | | | 340/432 |
| 2009/0240858 A1 | 9/2009 | Takebayashi | | |
| 2010/0037038 A1* | 2/2010 | Bieswanger | .......... | G06F 1/3203 |
| | | | | 712/220 |
| 2010/0173188 A1* | 7/2010 | Dhawan | ................ | H01M 2/105 |
| | | | | 429/156 |
| 2010/0214222 A1 | 8/2010 | Yen | | |
| 2011/0048830 A1* | 3/2011 | Radtke | ..................... | B62M 6/45 |
| | | | | 180/206.5 |
| 2011/0267178 A1* | 11/2011 | Nishihara | .............. | B62K 23/02 |
| | | | | 340/12.39 |
| 2012/0024639 A1* | 2/2012 | Castro | ....................... | B60T 7/16 |
| | | | | 188/24.22 |
| 2012/0221202 A1* | 8/2012 | Ikemoto | ................ | B62K 25/04 |
| | | | | 701/37 |
| 2012/0253600 A1* | 10/2012 | Ichida | .................... | B62M 25/08 |
| | | | | 701/37 |
| 2012/0322591 A1* | 12/2012 | Kitamura | ................... | B62J 6/06 |
| | | | | 474/80 |
| 2014/0102237 A1* | 4/2014 | Jordan | ................... | B62K 23/02 |
| | | | | 74/473.12 |
| 2015/0073656 A1* | 3/2015 | Takamoto | .................. | B62J 1/06 |
| | | | | 701/37 |
| 2016/0353375 A1* | 12/2016 | Shapley | .............. | G06F 19/3418 |

* cited by examiner

BICYCLE CONTROL SYSTEM

BACKGROUND

Field of the Invention

This invention generally relates to a bicycle control system. More specifically, the present invention relates to a bicycle control system.

Background Information

In recent years, some bicycles are provided with bicycle electric components to make it easier for the rider to operate the bicycle. For example, electric shifting devices (e.g., derailleurs, internally geared hubs, etc.) are now available for electrically shifting speeds of the drive train. Typically, the electric shifting devices are provided with an electric actuator or motor for changing gear ratios of the drive train. In an electric shifting apparatus, the bicycle is also equipped with a shift operating device that is manually operated for controlling one or more of the electric shifting devices of the electric shifting apparatus. These shift operating devices and the electric shifting devices can receive power from a main electrical power supply and/or they can be equipped with their own electrical power supply.

SUMMARY

In view of the state of the known technology and in accordance with a first aspect of the present disclosure, a bicycle control system is provided that basically comprises a power supply, a first bicycle electric component and a controller. The first bicycle electric component is electrically connected to the power supply to receive electrical power from the power supply. The controller is programmed to monitor an electrical communication of the first bicycle electric component. The controller is further programmed to stop electrical power from the power supply to the first bicycle electric component upon determining no electrical communication to or from the first bicycle electric component for a first predetermined inactivity period.

In accordance with a second aspect of the present invention, the bicycle control system according to the first aspect further comprises a second bicycle electric component electrically connected to the power supply to receive electrical power from the power supply. The controller is programmed to monitor an electrical communication of the second bicycle electric component. The controller is further programmed to stop electrical power from the power supply to the second bicycle electric component upon determining no electrical communication to or from the second bicycle electric component for a second inactivity predetermined period.

In accordance with a third aspect of the present invention, the bicycle control system according to the second aspect is configured so that the controller is programmed such that the first inactivity predetermined period of the first bicycle electric component is a different length of time from the second inactivity predetermined period of the second bicycle electric component.

In accordance with a fourth aspect of the present invention, the bicycle control system according to the second aspect is configured so that the controller is programmed such that the first inactivity predetermined period of the first bicycle electric component is equal to a length of time from the second inactivity predetermined period of the second bicycle electric component.

In accordance with a fifth aspect of the present invention, the bicycle control system according to the first aspect is configured so that the first bicycle electric component is one of a bicycle electric shifting device, a bicycle electric suspension, an electric adjustable seat post and an electric power-assisted motor.

In accordance with a sixth aspect of the present invention, the bicycle control system according to the first aspect further comprises a bicycle operating device electrically connected to the first bicycle electric component. The bicycle operating device is configured to output a control signal to the first bicycle electric component.

In accordance with a seventh aspect of the present invention, the bicycle control system according to the first aspect is configured so that further comprises a bicycle operating device having a wireless transmitter, and a wireless receiver electrically connected to the first bicycle electric component. The wireless receiver is programmed to receive a control signal from the wireless transmitter and output an operation signal to the first bicycle electric component in accordance with the control signal.

In accordance with an eighth aspect of the present invention, the bicycle control system according to the first aspect is configured so that the controller is programmed to place the first bicycle electric component in a suspend mode that reduces electrical power consumption upon determining no electrical communication to or from the first bicycle electric component for a predetermined suspend period shorter than the first predetermined inactivity period.

In accordance with a ninth aspect of the present invention, the bicycle control system according to the first aspect is configured so that the power supply includes a fuel cell.

In accordance with a tenth aspect of the present invention, a bicycle control system is provided that basically comprises a power supply, a first bicycle electric component and a controller. The first bicycle electric component is electrically connected to the power supply to receive electrical power from the power supply. The controller is programmed to monitor an electrical communication of the first bicycle electric component. The controller is further programmed to place the first bicycle electric component in a first suspend mode that reduces electrical power consumption from the power supply upon determining no electrical communication to or from the first bicycle electric component for a first predetermined inactivity period. The controller is further programmed to place the first bicycle electric component in a second suspend mode that further reduces electrical power consumption from the power supply to a lower consumption rate than in the first suspend mode upon determining no electrical communication to or from the first bicycle electric component for a second predetermined inactivity period that is longer than the first predetermined inactivity period.

In accordance with an eleventh aspect of the present invention, the bicycle control system according to the tenth aspect is configured so that the controller is programmed to stop electrical power from the power supply to the first bicycle electric component upon determining no electrical communication to or from the first bicycle electric component for a third predetermined inactivity period that is longer than the second predetermined inactivity period.

In accordance with a twelfth aspect of the present invention, the bicycle control system according to the tenth aspect further comprises a second bicycle electric component electrically connected to the power supply to receive electrical power from the power supply, and the controller being programmed to monitor an electrical communication of the second bicycle electric component, the controller being further programmed to place the second bicycle electric component in a first suspend mode that reduces electrical power consumption from the power supply upon determining no electrical communication to or from the second bicycle electric component for a fourth predetermined inactivity period, the controller being further programmed to place the second bicycle electric component in a second suspend mode that further reduces electrical power consumption from the power supply to a lower consumption rate than in the first suspend mode of the second bicycle electric component upon determining no electrical communication to or from the second bicycle electric component for a fifth predetermined inactivity period that is longer than the fourth predetermined inactivity period.

In accordance with a thirteenth aspect of the present invention, the bicycle control system according to the twelfth aspect is configured so that the controller is programmed such that the first inactivity predetermined period of the first bicycle electric component is a different length of time from the fourth inactivity predetermined period of the second bicycle electric component.

In accordance with a fourteenth aspect of the present invention, the bicycle control system according to the twelfth aspect is configured so that the controller is programmed such that the first inactivity predetermined period of the first bicycle electric component is equal to a length of time from the fourth inactivity predetermined period of the second bicycle electric component.

In accordance with a fifteenth aspect of the present invention, the bicycle control system according to the tenth aspect is configured so that the first bicycle electric component is one of a bicycle electric shifting device, a bicycle electric suspension, an electric adjustable seat post and an electric power-assisted motor.

In accordance with a sixteenth aspect of the present invention, the bicycle control system according to the tenth aspect further comprises a bicycle operating device electrically connected to the first bicycle electric component. The bicycle operating device is configured to output a control signal to the first bicycle electric component.

In accordance with a seventeenth aspect of the present invention, the bicycle control system according to the tenth aspect further comprises a bicycle operating device having a wireless transmitter, and a wireless receiver electrically connected to the first bicycle electric component. The wireless receiver is programmed to receive a control signal from the wireless transmitter and output an operation signal to the first bicycle electric component in accordance with the control signal.

In accordance with an eighteenth aspect of the present invention, the bicycle control system according to the tenth aspect is configured so that the power supply includes a fuel cell.

Also other objects, features, aspects and advantages of the disclosed bicycle control system will become apparent to those skilled in the art from the following detailed description, which, taken in conjunction with the annexed drawings, discloses one embodiment of the bicycle control system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
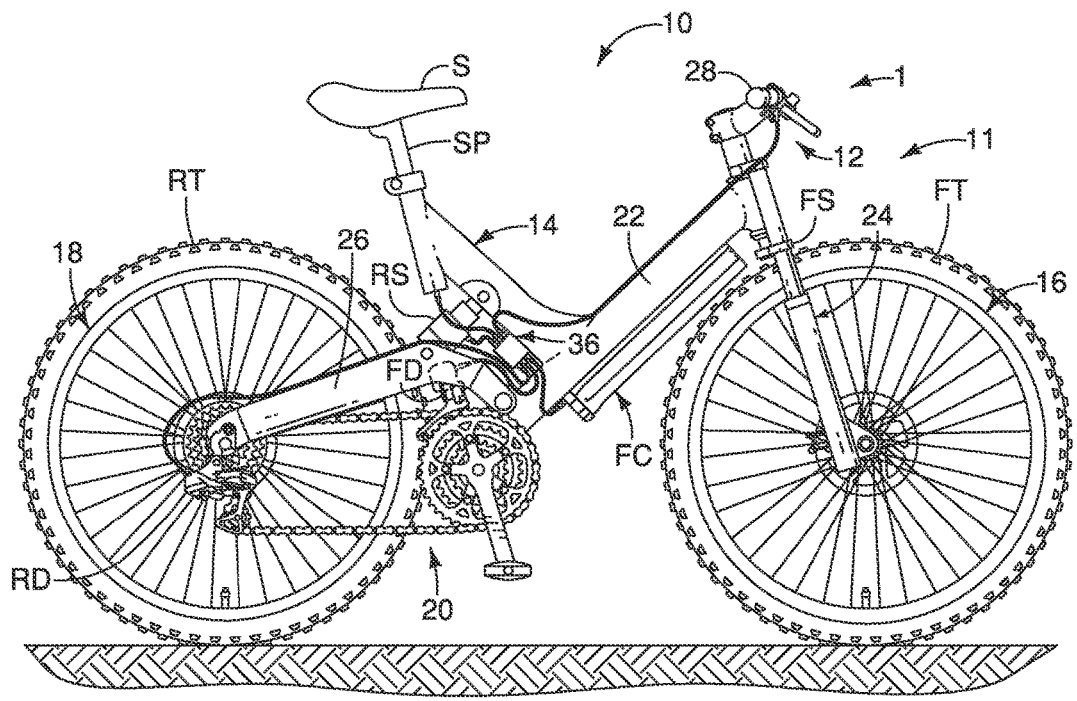
FIG. 1 is a side elevational view of a suspension type bicycle that is equipped with a bicycle control system in accordance with a first illustrated embodiment.
Figure 2:
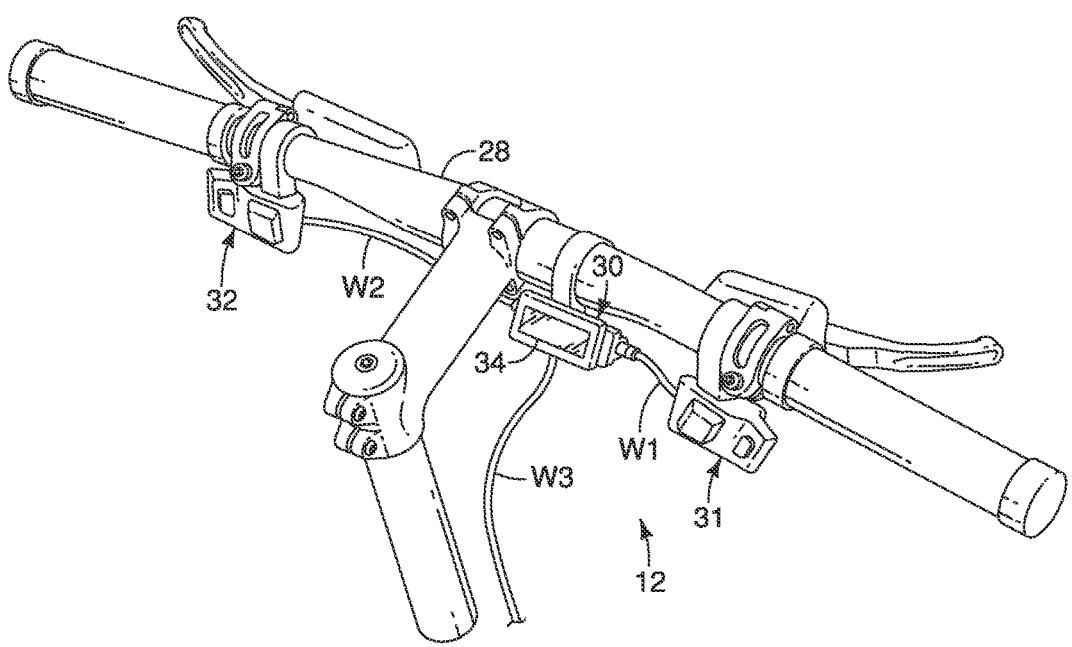
FIG. 2 is a perspective view of the handlebar area of the bicycle illustrated in FIG. 1, with a controller and two manually operated input members mounted to a straight type handlebar.

Referring initially to FIGS. 1 and 2, a suspension type bicycle 1 is illustrated that is equipped with a bicycle control system 12 for controlling the operations of various bicycle electric components in accordance with one illustrated embodiment. The bicycle 1 and its various parts are conventional, except for the bicycle control system 12 as discussed herein. Thus, the bicycle 1 and its various parts will not be discussed and/or illustrated in detail herein, except as needed to understand the bicycle control system 12.

As seen in FIG. 1, the bicycle 1 includes a bicycle body 10, a front wheel 16, a rear wheel 18 and a drive train 20. A front tire FT is attached to the front wheel 16, while a rear tire RT is attached to the rear wheel 18. The bicycle body 10 includes a bicycle frame set 11, a front shifting device FD, a rear shifting device RD, an adjustable seatpost SP, a power supply FC (e.g., a hydrogen powered fuel cell as shown or a battery), and a handlebar 28. The bicycle frame set 11 includes a bicycle frame 14 and a front fork 24. The bicycle frame 14 includes a frame main body 22 and a rear swing arm 26. The front fork 24 has a front suspension FS. A rear suspension RS is provided between the frame main body 22 and the rear swing arm 26. In this embodiment, the front shifting device FD can be a front derailleur and the rear shifting device RD can be a rear derailleur. A seat S is mounted to the adjustable seatpost SP, which vertically adjusts a position of the seat S with respect to the frame main body 22.

In the illustrated embodiment, the front derailleur FD, the rear derailleur RD, the front suspension FS, the rear suspension RS and the adjustable seatpost SP are examples of bicycle electric components that are adjustable between at least two operation modes. Thus, the front derailleur FD, the rear derailleur RD, the front suspension FS, the rear suspension RS and the adjustable seatpost SP will be collectively referred to as bicycle electric components FD, RD, FS, RS and SP for the sake of convenience.

The bicycle electric components FD, RD, FS, RS and SP can be any type of bicycle electric components. Since bicycle electric components are well known in the bicycle field, the bicycle electric components FD, RD, FS, RS and SP will not be disclosed and/or illustrated in detail herein. Moreover, the bicycle control system 12 is not limited to the bicycle electric components FD, RD, FS, RS and SP and the particular arrangements disclosed herein. Rather, the bicycle control system 12 can have any combination of the bicycle electric components FD, RD, FS, RS and SP as well as other bicycle electric components (not shown) as needed and/or desired. Thus, in the bicycle control system 12, preferably, the first bicycle electric component is one of a bicycle electric transmission device, a bicycle electric suspension, an electric adjustable seat post and a driving unit to assist pedaling of a rider of the bicycle 1. Likewise, in the bicycle control system 12, the second bicycle electric component is preferably one of a bicycle electric shifting device, a bicycle electric suspension, an electric adjustable seat post and a driving unit to assist pedaling of a rider of the bicycle 1.

As seen in FIG. 2, the bicycle control system 12 further comprises a controller 30. While the bicycle control system 12 is illustrated as having a plurality of bicycle electric components, the bicycle control system 12 can be used with only one bicycle electric component. Thus, the bicycle control system 12 broadly comprises the power supply FC, a first bicycle electric component (one of the bicycle electric components FD, RD, FS, RS and SP) and the controller 30. The first bicycle electric component is electrically connected to the power supply FC to receive electrical power from the power supply FC. Of course, the bicycle control system 12 can further comprise a second bicycle electric component that is electrically connected to the power supply FC to receive electrical power from the power supply FC. Basically, the controller 30 is programmed to control the bicycle electric components FD, RD, FS, RS and SP based on user control signals receives from the first and second operating devices 31 and 32. More specifically, the controller 30 is programmed to selectively control one or two bicycle electric components based on the manual operation of the first and second operating devices 31 and 32. Since bicycle control programs are known for shifting a shifting device, adjusting a seat height, and adjusting suspensions, the bicycle control programs will not be discussed herein.

Moreover, the controller 30 is programmed to control the distribution of electrical energy from the power supply FC to the bicycle electric components FD, RD, FS, RS and SP. The controller 30 is programmed to monitor an electrical communication of the first bicycle electric component. Of course, the controller 30 is also programmed to monitor an electrical communication of the second bicycle electric component when the bicycle control system 12 includes a second bicycle electric component.

In a first mode of operation, the controller 30 is further programmed to stop electrical power from the power supply FC to the first bicycle electric component upon determining no electrical communication to or from the first bicycle electric component for a first predetermined inactivity period, and the controller 30 is further programmed to stop electrical power from the power supply FC to the second bicycle electric component upon determining no electrical communication to or from the second bicycle electric component for a second inactivity predetermined period.

The user can selectively set the lengths of the first and second inactivity predetermined periods. In a first user setting, the controller 30 is programmed such that the first inactivity predetermined period of the first bicycle electric component is a different length of time from the second inactivity predetermined period of the second bicycle electric component. In a first user setting, the controller 30 is programmed such that the first inactivity predetermined period of the first bicycle electric component is equal to a length of time from the second inactivity predetermined period of the second bicycle electric component.

In a second mode of operation, the controller 30 is programmed to place the first bicycle electric component in a suspend mode that reduces electrical power consumption upon determining no electrical communication to or from the first bicycle electric component for a predetermined suspend period shorter than the first predetermined inactivity period.

In a third mode of operation, the controller 30 is further programmed to place the first bicycle electric component in a first suspend mode that reduces electrical power consumption from the power supply upon determining no electrical communication to or from the first bicycle electric component for a first predetermined inactivity period. The controller is further programmed to place the first bicycle electric component in a second suspend mode that further reduces electrical power consumption from the power supply to a lower consumption rate than in the first suspend mode upon determining no electrical communication to or from the first bicycle electric component for a second predetermined inactivity period that is longer than the first predetermined inactivity period. In this third mode of operation, the controller 30 is further programmed to stop electrical power from the power supply to the first bicycle electric component upon determining no electrical communication to or from the first bicycle electric component for a third predetermined inactivity period that is longer than the second predetermined inactivity period.

In the third mode of operation, when the controller 30 is controlling the first and second bicycle electric components, the controller 30 is programmed so that the user can individually and independently set various suspend modes having different suspend periods of time and stop periods of time. Specifically, the controller 30 is further programmed to place the second bicycle electric component in a first suspend mode that reduces electrical power consumption from the power supply upon determining no electrical communication to or from the second bicycle electric component for a fourth predetermined inactivity period. The first suspend mode for the second bicycle electric component can be the same or different from the first suspend mode for the first bicycle electric component. Depending on the type of components, the controller 30 is programmed such that the first inactivity predetermined period of the first bicycle electric component is a different length of time from the fourth inactivity predetermined period of the second bicycle electric component. Alternatively depending on the type of components, the controller 30 is programmed such that the first inactivity predetermined period of the first bicycle electric component is equal to a length of time from the fourth inactivity predetermined period of the second bicycle electric component.

In the third mode of operation, the controller 30 is further programmed to place the second bicycle electric component in a second suspend mode that further reduces electrical power consumption from the power supply to a lower consumption rate than in the first suspend mode of the second bicycle electric component upon determining no electrical communication to or from the second bicycle electric component for a fifth predetermined inactivity period that is longer than the fourth predetermined inactivity period. The second suspend mode for the second bicycle electric component can be the same or different from the second suspend mode for the first bicycle electric component. Also the predetermined suspend periods for each of the suspend modes is preferably shorter than the corresponding predetermined inactivity period.

As seen in FIG. 2, the controller 30 is proved with a touch screen 34 for displaying the current operation mode as well as other information as needed and/or desired. The touch screen 34 can be used as an input device that the rider can use to change various settings of the operation modes of the first and second operating devices 31 and 32 and/or the bicycle electric components FD, RD, FS, RS and SP as needed and/or desired.

As seen in FIG. 2, the bicycle control system 12 further comprises a first operating device 31 and a second operating device 32. The first bicycle operating device 31 is electrically connected to the first bicycle electric component (i.e., one of the bicycle electric components FD, RD, FS, RS and SP) via the controller 30, while the second bicycle operating device 32 is electrically connected to the second bicycle electric component (i.e., one of the bicycle electric components FD, RD, FS, RS and SP) via the controller 30. In this way, the first bicycle operating device 31 is configured to output a control signal to the first bicycle electric component. (i.e., one of the bicycle electric components FD, RD, FS, RS and SP via the controller 30, while the second bicycle operating device 32 is electrically connected to the second bicycle electric component (i.e., one of the bicycle electric components FD, RD, FS, RS and SP) via the controller 30.

The first operating device 31 is mounted to the handlebar 28 near the right handgrip, while the second operating device 32 is mounted to the handlebar 28 near the left handgrip. However, the first and second operating devices 31 and 32 can be mounted at other locations as needed and/or desired. Also, while the first and second operating devices 31 and 32 are illustrated with a single user operated push-button, it will be apparent from those skilled in the bicycle field that the first and second operating devices 31 and 32 can have other configurations. For example, the first and second operating devices 31 and 32 can each have two or more buttons, one or levers, a joy stick, etc. For the sake of simplicity, each of the first and second operating devices 31 and 32 has a single user operated push-button that can be pushed in a variety of ways (e.g., a short push, a long push, multiple pushes, etc.) to control one or two of the bicycle electric components FD, RD, FS, RS and SP.

The controller 30 can also include an automatic bicycle control program (e.g., automatic bicycle shifting program, automatic bicycle seat adjustment program, automatic bicycle suspension adjustment program, or the like) to control the bicycle electric components FD, RD, FS, RS and SP based on various sensors providing input signals relating to one or more operating conditions and/or one or more riding conditions. Since automatic bicycle control programs are known and the bicycle control system 12 can be used with any automatic bicycle control program that is developed, the automatic bicycle control programs will not be discussed herein. In any case, in the first embodiment, the controller 30 selectively outputs a control parameter to the bicycle electric component(s) being controlled for selectively controlling an operating state of the bicycle electric component(s), as discussed below.

Figure 3:
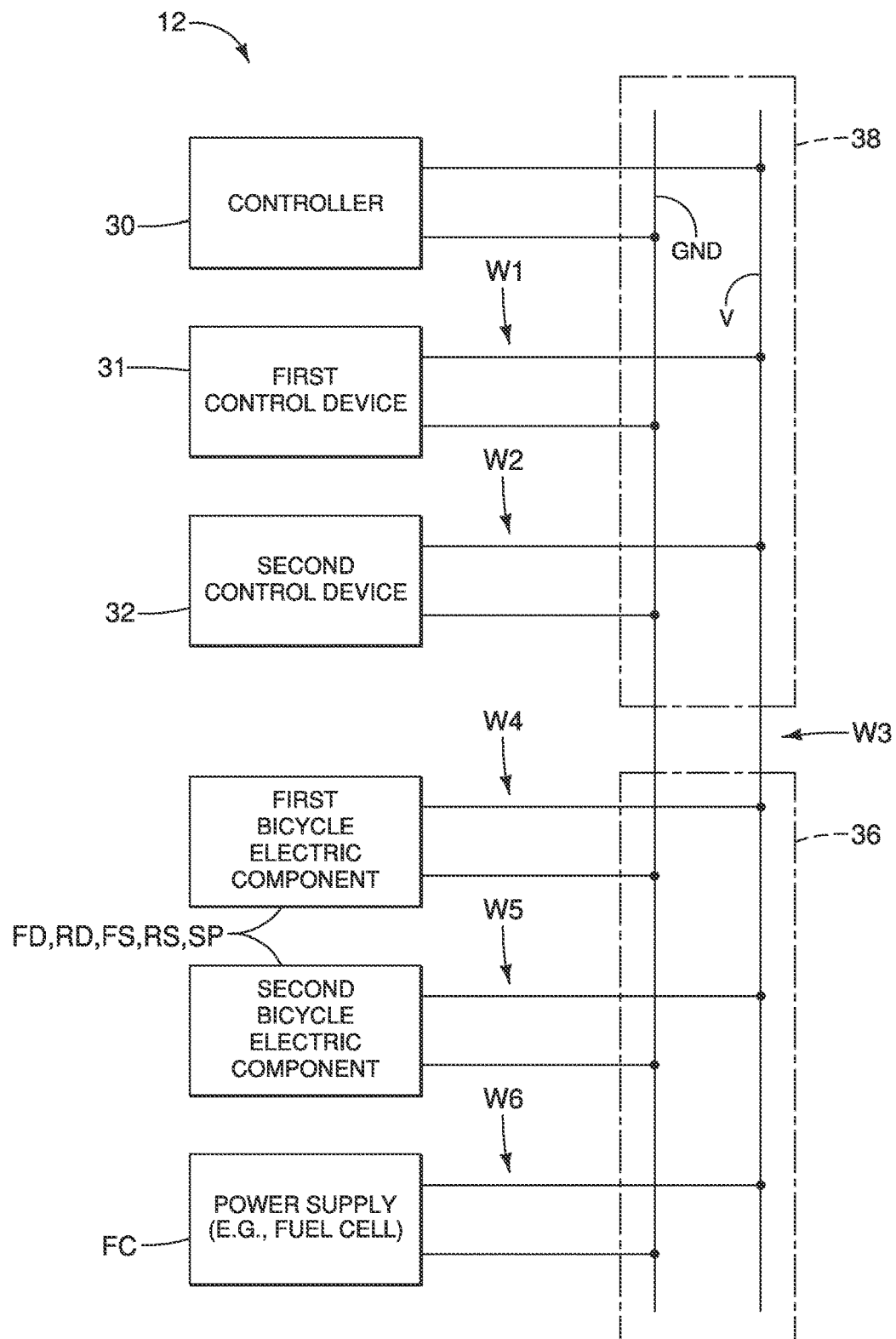
FIG. 3 is a block diagram showing an electric component connection structure of a first configuration of the bicycle control system in which the controller, the manually operated operating devices and the bicycle electric components (e.g., shifting devices in the form of front and rear derailleurs) are electrically connected together and communicate using power line communication (PLC) in accordance with the first embodiment.

As seen in FIGS. 1 and 3, the bicycle control system 12 further includes an electrical wiring junction 36, which is used to connect the power supply FC and the bicycle electric components FD, RD, FS, RS and SP to the controller 30. The controller 30 has an I/O interface 38 for electrically connecting the first and second operating devices 31 and 32 and the power supply FC to the controller 30. Of course, it will be apparent from this disclosure that the electrical wiring junction 36 can be integrated with the I/O interface 38 inside the housing of the controller 30, if needed and/or desired. A seen in FIGS. 2 and 3, in the first embodiment, the controller 30 is electrically connected to the first operating device 31 via a first electric power line W1, and electrically connected to the second operating device 32 via a second electric power line W2. The electrical wiring junction 36 is electrically connected to the controller 30 via a third electric power line W3. With this arrangement, the power supply FC is electrically connect to all of the bicycle electric components FD, RD, FS, RS and SP and to the controller 30 for supplying power thereto. Alternatively, the bicycle electric components FD, RD, FS, RS and SP and the controller 30 can have individually separate power supplies that are controlled by the controller 30 and/or individual controllers of the bicycle electric components FD, RD, FS, RS and SP.

As seen in FIGS. 1 and 3, the power supply FC includes the hydrogen powered fuel cell, which supplies electrical power to the controller 30 and the first and second operating devices 31 and 32. Also the power supply FC supplies electrical power to \the bicycle electric components FD, RD, FS, RS and SP. In other words, the power supply FC constitutes an electrical energy storage device or storage element that serves as a power source for the electrical components of the bicycle 1. The power supply FC is not limited to a hydrogen powered fuel cell as the power supply. Rather, for example, a battery, a generator by itself or a generator in conjunction with a battery can be used for the power supply of the controller 30 and the bicycle electric components FD, RD, FS, RS and SP.

Each of the first and second operating devices 31 and 32 selectively outputs a control signal to the controller 30. The touch screen of the controller 30 can be set to change the operating mode for the first and second operating devices 31 and 32 so that the first and second operating devices 31 and 32 can be used to operate or control any one of the bicycle electric components FD, RD, FS, RS and SP. In this way, separate operating devices are not need for each of the bicycle electric components.

In response to receiving the control signal(s), the controller 30 outputs an operation signal to change a setting or operating state of the bicycle electric components FD, RD, FS, RS and SP that are in communication with the controller 30. The setting or operating state of the bicycle electric components FD, RD, FS, RS and SP is changed in accordance with a control parameter that is outputted by the controller 30, as discussed below. The term "signal" as used herein is not limited to an electrical signal, but includes other types of signals such as a command or a wireless transmission depending on the configuration of the bicycle control system 12.

As seen in FIGS. 3 to 6, the structure of the bicycle control system 12 is diagrammatically illustrated. For the sake of simplicity, only two bicycle electric components are illustrated in FIG. 3. In the first embodiment, power line communication technology is used for communicating between a plurality of electric devices (i.e., the first operating devices 31 and 32 and the bicycle electric components FD, RD, FS, RS and SP). Power line communication (PLC) carries data on a conductor that is also used simultaneously for electric power transmission or electric power distribution to the electric component. Power line communication uses unique identifying information such as a unique identifier that is assigned to each of the electric devices (i.e., the first operating devices 31 and 32 and the bicycle electric components FD, RD, FS, RS and SP). Preferably, each of the electric devices (i.e., the first operating devices 31 and 32 and the bicycle electric components FD, RD, FS, RS and SP) is provided with a memory from which information stored by communications can be read and in which the unique identifying information is stored.

Referring to FIG. 3, a basic wiring configuration of the bicycle control system 12 is illustrated. Each of the electric power lines W1 to W6 includes a ground line GND and a power or voltage line V that are detachably connected to a serial bus that is formed by the communication interface 32 and the electrical wiring junction 36. The first and second operating devices 31 and 32 and the first and second bicycle electric components (e.g., two of FD, RD, FS, RS and SP) can all communicate with the controller 30 through the power voltage line V. Thus, the controller 30 is configured to receive the control signals from the first operating devices 31 and 32 via power line communication (PLC).

Figure 4:
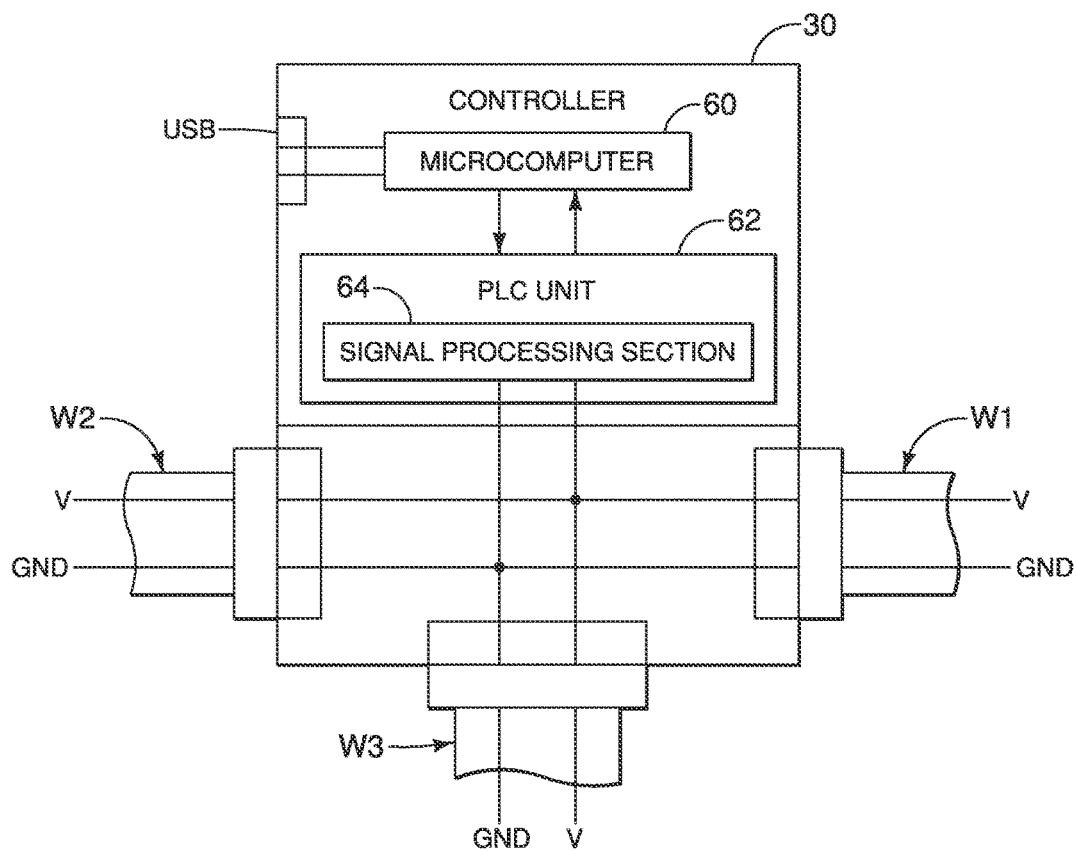
FIG. 4 is a schematic block diagram showing a basic configuration of the controller of the bicycle control system when using power line communication (PLC) as illustrated in FIG. 3.

Referring to now FIG. 4, a schematic block diagram is illustrated that shows a basic configuration of the controller 30. The controller 30 is includes a central microcomputer 60 and a power line communication (PLC) unit 62 that includes a signal processing section 64. The power line communication unit 62 is connected to the power supply FC for receiving electric power as mentioned above. The power line communication unit 62 is part of a power line communication (PLC) system that is configured to execute two-way communications with each of the bicycle electric components FD, RD, FS, RS and SP, and each of the first and second operating devices 31 and 32 through the power lines W1 to W6. Thus, operation signals or commands that control the bicycle electric components FD, RD, FS, RS and SP are superimposed on the power source voltage flowing in the electric power lines W1 to W6 that interconnect the controller 30, the bicycle electric components FD, RD, FS, RS and SP and the first and second operating devices 31 and 32. In this way, data can be transmitted between the controller 30 and the bicycle electric components FD, RD, FS, RS and SP. Optionally, instead of using power line communications (PLC), in addition to a ground wire GND and a voltage wire V, separate dedicated signal wires can be provided for transmitting data between the controller 30, the bicycle electric components FD, RD, FS, RS and SP and the first and second operating devices 31 and 32, as needed and/or desired.

The central microcomputer 60 includes control circuits with one or more CPUs, storage devices, computation units and the like. The central microcomputer 60 also includes software that outputs the predetermined control parameters in accordance with the control signals outputted from the first and second operating devices 31 and 32. In particular, using the signal processing section 64, the central microcomputer 60 outputs predetermined control parameters output based on the operation of the first and second operating devices 31 and 32 to control the bicycle electric components FD, RD, FS, RS and SP in accordance with the control signals outputted from the first and second operating devices 31 and 32.

Figure 5:
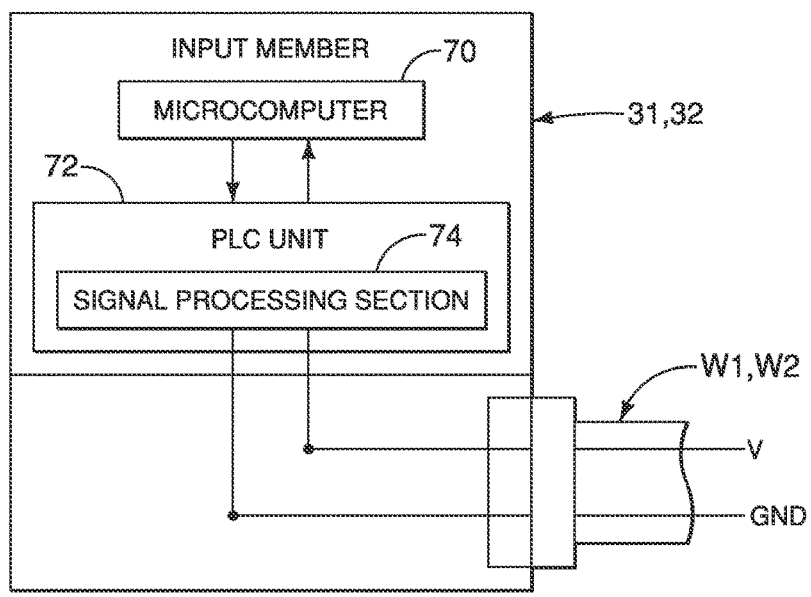
FIG. 5 is a schematic block diagram showing a basic configuration of each of the manually operated operating devices of the bicycle control system as illustrated in FIG. 3.

Referring to now FIG. 5, the basic configuration of the controlling part of each of the first and second operating devices 31 and 32 will now be discussed. The mechanical structures of the first and second operating devices 31 and 32 are well known in the bicycle field. For this reason, the mechanical structures of the first and second operating devices 31 and 32 are not illustrated and/or discussed in detail herein. Each of the first and second operating devices 31 and 32 is basically provided with a microcomputer 70, a power line communication (PLC) unit 72 that includes a signal processing section 74. The power line communication unit 72 is connected to the power supply FC for receiving electric power. The signal processing section 74 can be integrated into the microcomputer 70 or a separate component as needed and/or desired.

Figure 6:
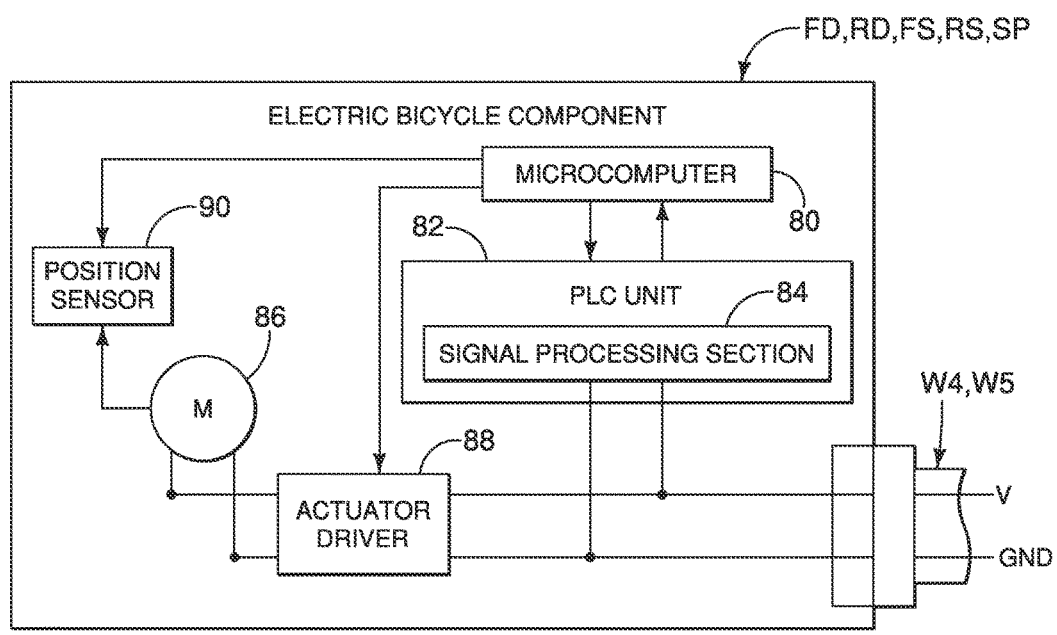
FIG. 6 is a schematic block diagram showing a basic configuration of each of the bicycle electric components of the bicycle control system in accordance with the first embodiment.

Referring to now FIG. 6, the basic configuration of the controlling part of each of the bicycle electric components FD, RD, FS, RS and SP will now be discussed. The mechanical structures of the bicycle electric components FD, RD, FS, RS and SP are well known in the bicycle field. For this reason, the mechanical structures of the bicycle electric components FD, RD, FS, RS and SP are not illustrated and/or discussed in detail herein. Each of the bicycle electric components FD, RD, FS, RS and SP is basically provided with a microcomputer 80 and a power line communication (PLC) unit 82 that includes a signal processing section 84. Alternatively, the microcomputer 80 can be eliminated and the control functions of the microcomputer 80 can be performed by the controller 30.

Each of the bicycle electric components FD, RD, FS, RS and SP is also provided with an electric actuator 86, an actuator driver 88 and a position sensor 90. The actuator 86 is a reversible motor that is configured and arranged to drive a valve, a like or the like of the bicycle electric component. While the electric actuator 86 is illustrated as a motor in the illustrated embodiments, the electric actuator 86 can be other types of devices such as a solenoid. The electric actuator 86 adjusts the position of a part to set a state of the bicycle electric component, e.g., a lockout state, a damping rate state, a travel-stroke length state, a gear position, a seatpost height position state etc. The actuator driver 88 drives the electric actuator 86 in response to control signals from the microcomputer 80. The actuator driver 88 includes motor drivers and deceleration units for driving and decelerating the rotation of the electric actuator 86. The position sensor 90 detects the position of the electric actuator 86 or other part of the bicycle electric component that is indicative its current setting position or state. The microcomputer 80 is programmed to control the actuator driver 88 in response to an adjustment signal from the input device for that bicycle electric component via the controller 30. The microcomputer 80 includes software that controls the electric actuator 86 in accordance with adjustment signals outputted from the controller 30 due to operation of the first and second operating devices 31 and 32.

Figure 7:
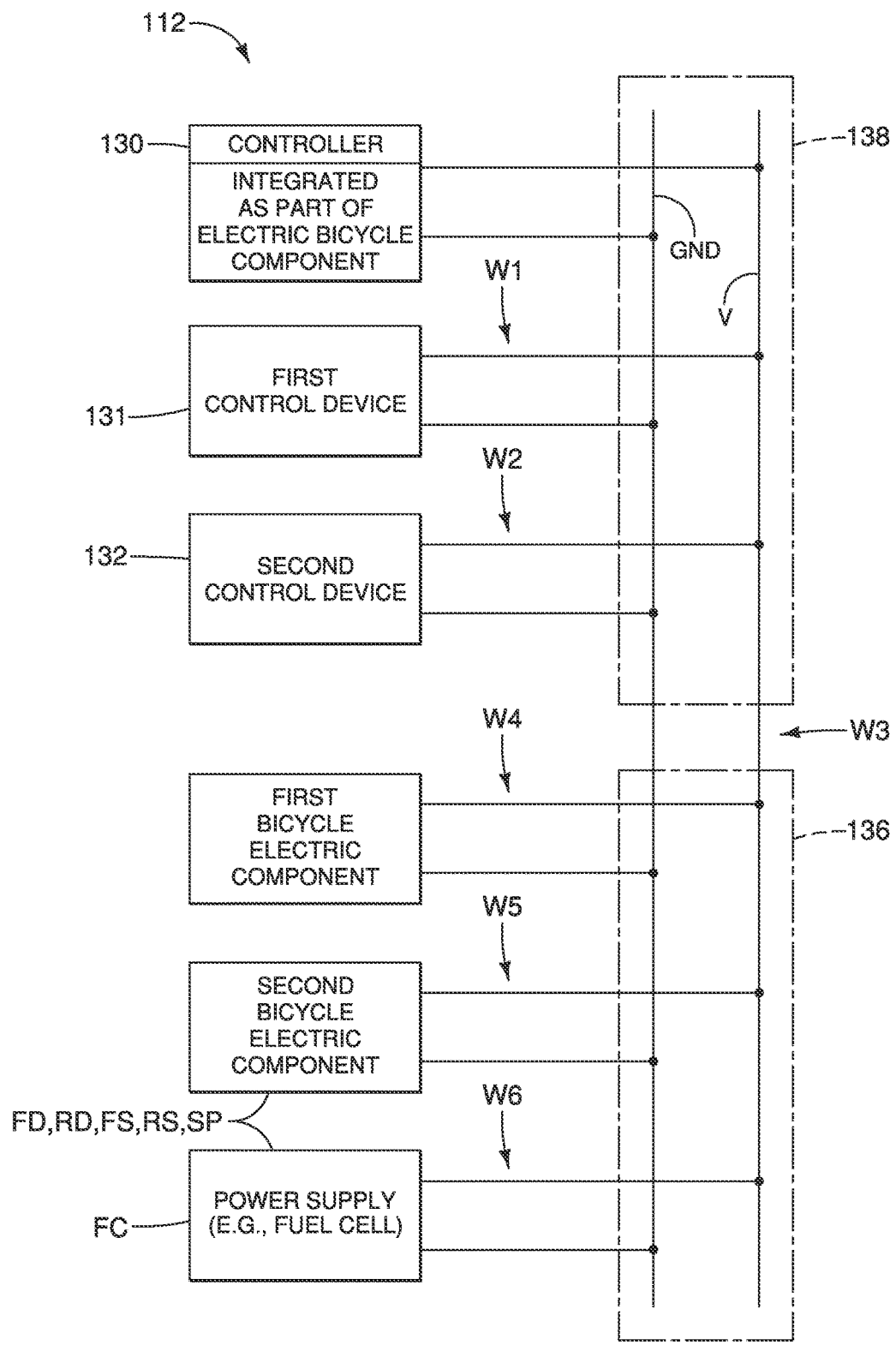
FIG. 7 is a flowchart showing a first power supply control process executed by the controller of the bicycle control system for monitoring electrical communications of a bicycle electric component, and stopping electrical power to the bicycle electric component upon determining a first predetermined inactivity period has elapsed.

Referring to now FIG. 7, a basic wiring configuration of a bicycle control system 112 is illustrated in accordance with a second embodiment. Here, the bicycle control system 112 is identical to the bicycle control system 12, as discussed above, except that the controller is disposed on one of the at least one bicycle electric component, instead of the controller 30 being separate and remote from the at least one bicycle electric component as in the first embodiment. Thus, the bicycle control system 112 basically includes a controller 130 that is identical to the controller 30 of the first embodiment, except that the controller 130 is integrated into one of the bicycle electric components FD, RD, FS, RS and SP. Here, in the second embodiment, an electrical wiring junction 136 is used that is identical to the electrical wiring junction 36 of the first embodiment. The controller 130 is provided with an I/O interface 138 that is identical to the I/O interface 38 of the first embodiment. The operation modes are the same as the ones discussed above with respect to the first embodiment.

Figure 8:
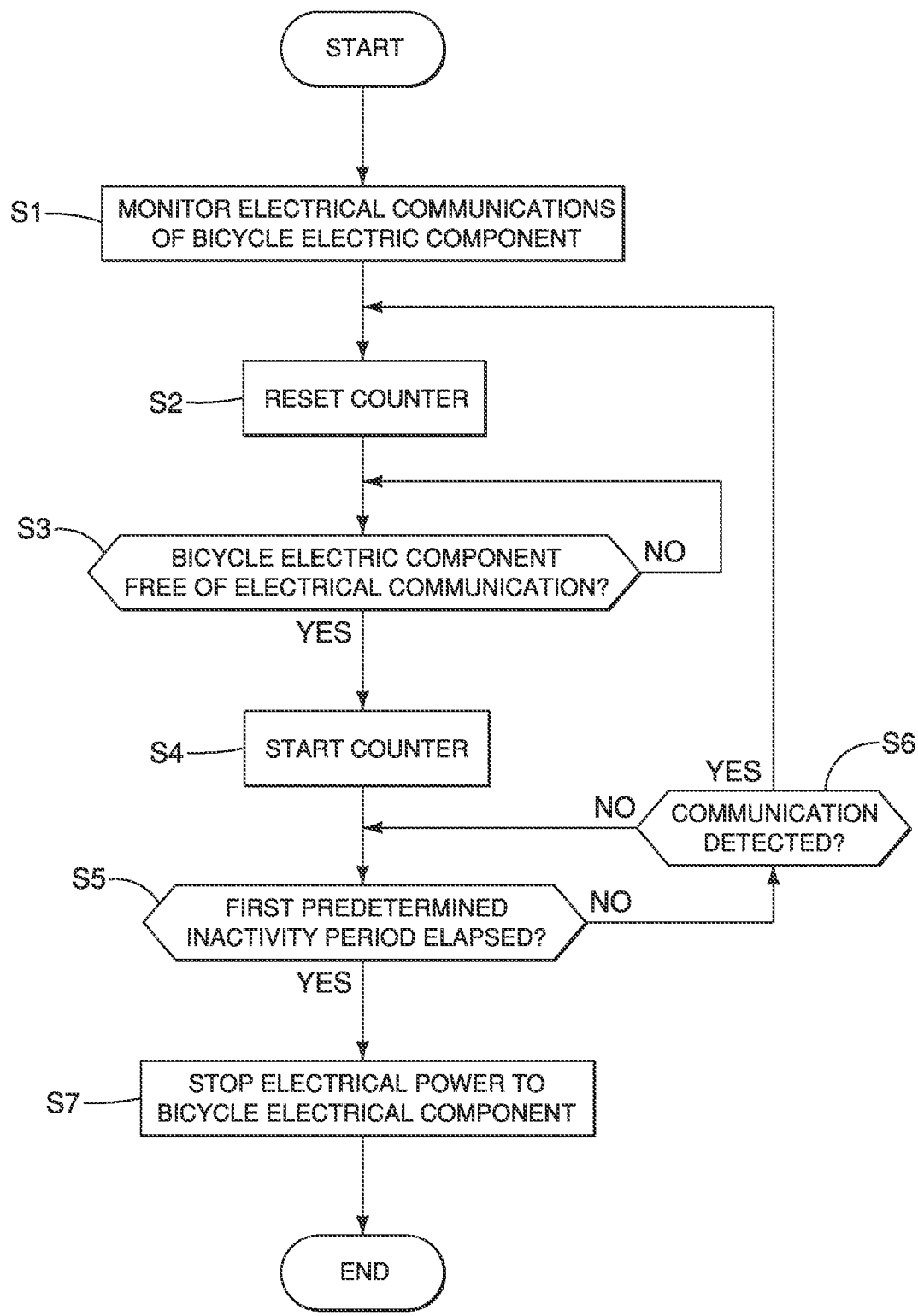
FIG. 8 is a flowchart showing a second power supply control process executed by the controller of the bicycle control system for monitoring electrical communications of a bicycle electric component, and placing the bicycle electric component in a first suspend mode upon determining a first predetermined inactivity period has elapsed, and stopping electrical power to the bicycle electric component upon determining a second predetermined inactivity period has elapsed.

As seen in FIG. 8, a flowchart is shown for conducting a first power supply control process in the bicycle control system 12 and in the bicycle control system 112. This first power supply control process is executed by the controller 30 for monitoring electrical communications of the bicycle electric components, and stopping electrical power to the bicycle electric components upon determining a first predetermined inactivity period has elapsed. The first predetermined inactivity period can be different for each of the bicycle electric components, or some or all of the first predetermined inactivity periods can be equal, as needed and/or desired. Preferably, the first predetermined inactivity period for each of the bicycle electric components can be individually and independently set by the user to the desired time period.

Once the controller 30 is started (e.g., powered up), the controller 30 proceeds to step S1 where the controller 30 starts monitoring the communications between the controller 30 and the bicycle electric components. The controller 30 can have individual programs, such as the flowchart of FIG. 8, for each of the bicycle electric components so that the controller 30 individually monitors the bicycle electric components simultaneously or sequentially. Alternatively, the flowchart of FIG. 8 can be modified to integrate the monitoring of the bicycle electric components into one single flow chart.

In the PLC system of the bicycle control system 12 in accordance with the first embodiment, the operation signals from the controller 30 and the bicycle electric components are outputted in broadcast mode such that all the controllers of all of the bicycle electric components and the controller 30 receives the all operation signals and the controllers sort out necessary signal. Thus, the controller 30 can determine which of the bicycle electric components are communicating and which of the bicycle electric components are inactive.

After the controller 30 starts continuously monitoring the communication of the bicycle electric component, the process proceeds to step S2. In step S2, the controller 30 resets a counter that can count down or count up to start measuring the first predetermined inactivity period. Then the process proceeds to step S3.

In step S3, the controller 30 determines if the bicycle electric component is inactive (free of electrical communication), or active (communicating—sending and/or receiving signals). If the controller 30 detects the bicycle electric component is communicating, then the controller 30 continuously monitors the communication of the bicycle electric component by continuously repeating step S3. Once a period of inactivity is detected in the bicycle electric component being monitored, the process then proceeds to step S4.

In step S4, the controller 30 starts the counter. Then the process proceeds to step S5.

In step S5, the controller 30 determines if the first predetermined inactivity period has elapsed or not. If the first predetermined inactivity period has not elapsed, then the process proceeds to step S6.

In step S6, the controller 30 determines if a signal has been sent to the bicycle electric component being monitored, and/or if a signal has been received by the bicycle electric component being monitored. If the bicycle electric component being monitored has started communicating again, then the process proceeds back to step S2. On the other hand, if the bicycle electric component being monitored is still not communicating, then the process proceeds back to step S5.

In step S5, if the first predetermined inactivity period has elapsed, then the process proceeds to step S7, where the power supply to the bicycle electric component being monitored is stopped. There are at least two ways in which the power supply to the bicycle electric component(s) being monitored can be stopped. First, the power supply FC includes a power supply controller having has a control function to control the electric energy distribution, and the controller 30 output an electric energy control signal to the power supply controller such that the power supply controller turns off the electric energy to the bicycle electric component(s) that were determined to be inactive. Second, the controller 30 has a control function to control the electric energy distribution from the power supply FC to the bicycle electric components such that the controller 30 turns off the electric energy to the bicycle electric component(s) that were determined to be inactive.

Figure 9:
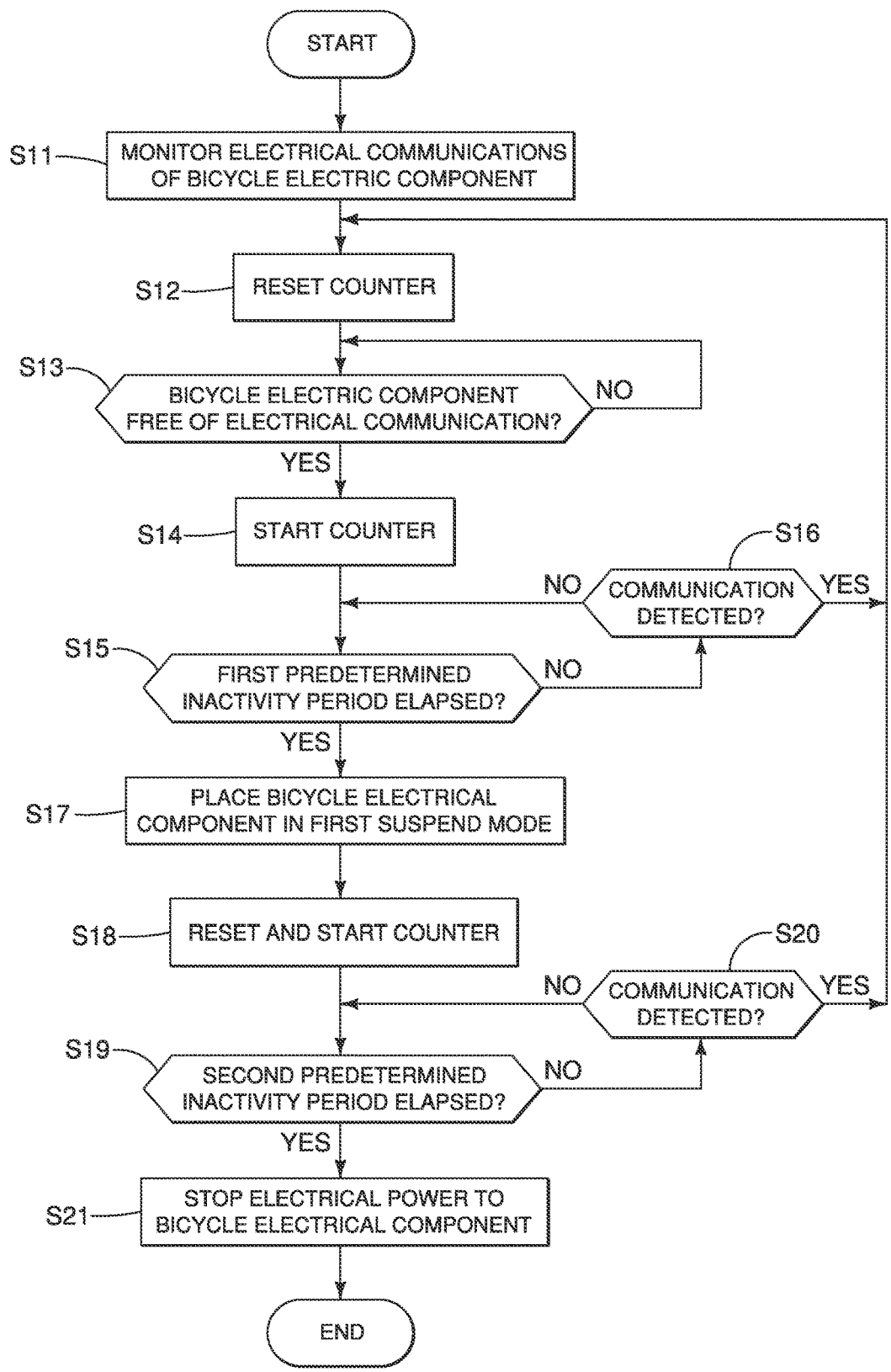
FIG. 9 is a flowchart showing a third power supply control process executed by the controller of the bicycle control system for monitoring electrical communications of a bicycle electric component, and placing the bicycle electric component in a first suspend mode upon determining a first predetermined inactivity period has elapsed, placing the bicycle electric component in a second suspend mode upon determining a second predetermined inactivity period has elapsed, and stopping electrical power to the bicycle electric component upon determining a third predetermined inactivity period has elapsed.

As seen in FIG. 9, a flowchart is shown for conducting a second power supply control process in the bicycle control system 12 and in the bicycle control system 112. This second power supply control process is executed by the controller 30 for monitoring electrical communications of the bicycle electric components, and placing the bicycle electric component in a first suspend mode upon determining a first predetermined inactivity period has elapsed, and stopping electrical power to the bicycle electric component upon determining a second predetermined inactivity period has elapsed. The first and second predetermined inactivity periods can be different for each of the bicycle electric components, or some or all of the first and second predetermined inactivity periods can be equal, as needed and/or desired. Preferably, the first and second predetermined inactivity periods for each of the bicycle electric components can be individually and independently set by the user to the desired time periods.

Once the controller 30 is started (e.g., powered up), the controller 30 proceeds to step S11 where the controller 30 starts monitoring the communications between the controller 30 and the bicycle electric components. The controller 30 can have individual programs, such as the flowchart of FIG. 9, for each of the bicycle electric components so that the controller 30 individually monitors the bicycle electric components simultaneously or sequentially. Alternatively, the flowchart of FIG. 9 can be modified to integrate the monitoring of the bicycle electric components into one single flow chart.

In the PLC system of the bicycle control system 12 in accordance with the first embodiment, the operation signals from the controller 30 and the signals the bicycle electric components are outputted in broadcast mode such that all the controllers of all of the bicycle electric components and the controller 30 receives the all signals and the controllers sort out necessary signal. Thus, the controller 30 can determine which of the bicycle electric components are communicating and which of the bicycle electric components are inactive.

After the controller 30 starts continuously monitoring the communication of the bicycle electric component, the process proceeds to step S12. In step S12, the controller 30 resets and starts a counter that can count down or count up to start measuring the first predetermined inactivity period. Then the process proceeds to step S13.

In step S13, the controller 30 determines if the bicycle electric component is inactive (free of electrical communication), or active (communicating—sending and/or receiving signals). If the controller 30 detects the bicycle electric component is communicating, then the controller 30 continuously monitors the communication of the bicycle electric component by continuously repeating step S13. Once a period of inactivity is detected in the bicycle electric component being monitored, the process then proceeds to step S14.

In step S14, the controller 30 starts the counter. Then the process proceeds to step S15.

In step S15, the controller 30 determines if the first predetermined inactivity period has elapsed or not. If the first predetermined inactivity period has not elapsed, then the process proceeds to step S16.

In step S16, the controller 30 determines if a signal has been sent to the bicycle electric component being monitored, and/or if a signal has been received by the bicycle electric component being monitored. If the bicycle electric component being monitored has started communicating again, then the process proceeds back to step S12. On the other hand, if the bicycle electric component being monitored is still not communicating, then the process proceeds back to step S15.

In step S15, if the first predetermined inactivity period not elapsed, then the process proceeds to step S17, where the power supply to the bicycle electric component being monitored is reduced so as to place the bicycle electric component being monitored in a first suspend mode for a predetermined suspend period. The predetermined suspend period for the first suspend mode is shorter than the first predetermined inactivity period.

There are at least two ways in which the power supply to the bicycle electric component(s) being monitored can be reduced. First, the power supply FC includes a power supply controller having has a control function to control the electric energy distribution, and the controller 30 output an electric energy control signal to the power supply controller such that the power supply controller reduces the electric energy to the bicycle electric component(s) that were determined to be inactive. Second, the controller 30 has a control function to control the electric energy distribution from the power supply FC to the bicycle electric components such that the controller 30 reduces the electric energy to the bicycle electric component(s) that were determined to be inactive.

In step S18, the controller 30 resets and starts the counter. Then the process proceeds to step S19.

In step S19, the controller 30 determines if the second predetermined inactivity period has elapsed or not. If the second predetermined inactivity period has not elapsed, then the process proceeds to step S20.

In step S20, the controller 30 determines if a signal has been sent to the bicycle electric component being monitored, and/or if a signal has been received by the bicycle electric component being monitored. If the bicycle electric component being monitored has started communicating again, then the process proceeds back to step S12. On the other hand, if the bicycle electric component being monitored is still not communicating, then the process proceeds back to step S19.

In step S19, if the second predetermined inactivity period has elapsed, then the process proceeds to step S21, where the power supply to the bicycle electric component being monitored is stopped. Here, the controller 30 or a battery supply controller of the power supply FC turns off the electric energy to the bicycle electric component(s) that were determined to be inactive.

Figure 10:
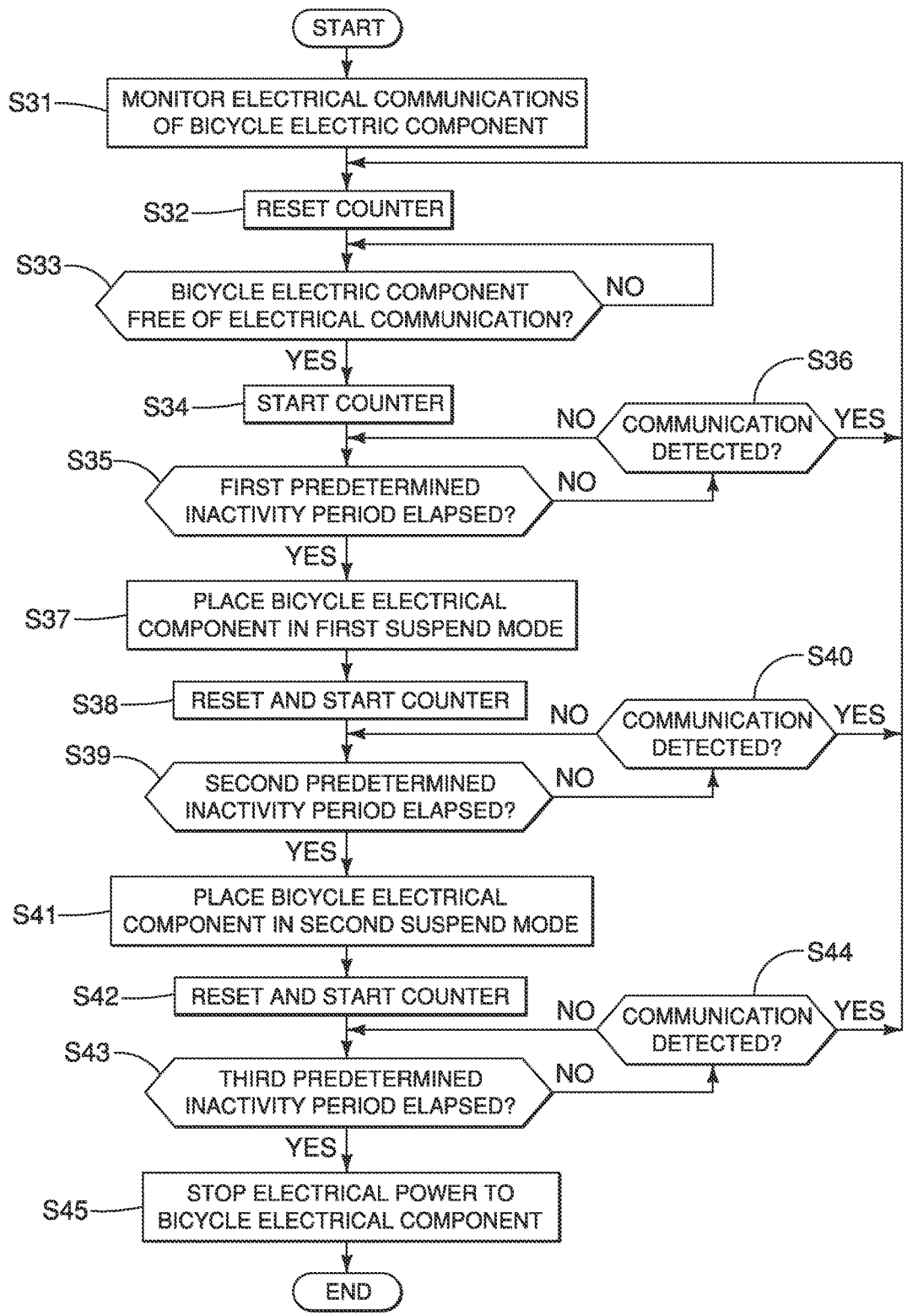
FIG. 10 is a block diagram showing an electric component connection structure of another configuration of the bicycle control system in which the controller is a part of an bicycle electric component, and the manually operated operating devices and the bicycle electric components are electrically connected together and communicate using power line communication (PLC) in accordance with a second embodiment.

As seen in FIG. 10, a flowchart is shown for conducting a third power supply control process in the bicycle control system 12 and in the bicycle control system 112. This third power supply control process is executed by the controller 30 for monitoring electrical communications of the bicycle electric components, and placing the bicycle electric component in a first suspend mode upon determining a first predetermined inactivity period has elapsed, placing the bicycle electric component in a second suspend mode upon determining a second predetermined inactivity period has elapsed, and stopping electrical power to the bicycle. The first, second and third predetermined inactivity periods can be different for each of the bicycle electric components, or some or all of the first, second and third predetermined inactivity periods can be equal, as needed and/or desired. Preferably, the first, second and third predetermined inactivity periods for each of the bicycle electric components can be individually and independently set by the user to the desired time periods.

Once the controller 30 is started (e.g., powered up), the controller 30 proceeds to step S31 where the controller 30 starts monitoring the communications between the controller 30 and the bicycle electric components. The controller 30 can have individual programs, such as the flowchart of FIG. 10, for each of the bicycle electric components so that the controller 30 individually monitors the bicycle electric components simultaneously or sequentially. Alternatively, the flowchart of FIG. 10 can be modified to integrate the monitoring of the bicycle electric components into one single flow chart.

In the PLC system of the bicycle control system 12 in accordance with the first embodiment, the signals from the controller 30 and the bicycle electric components are outputted in broadcast mode such that all the controllers of all of the bicycle electric components and the controller 30 receives the all signals and the controllers sort out necessary signal. Thus, the controller 30 can determine which of the bicycle electric components are communicating and which of the bicycle electric components are inactive.

After the controller 30 starts continuously monitoring the communication of the bicycle electric component, the process proceeds to step S32. In step S32, the controller 30 resets a counter that can count down or count up to start measuring the first predetermined inactivity period. Then the process proceeds to step S33

In step S33, the controller 30 determines if the bicycle electric component is inactive (free of electrical communication), or active (communicating—sending and/or receiving signals). If the controller 30 detects the bicycle electric component is communicating, then the controller 30 continuously monitors the communication of the bicycle electric component by continuously repeating step S33. Once a period of inactivity is detected in the bicycle electric component being monitored, the process then proceeds to step S34.

In step S34, the controller 30 starts the counter. Then the process proceeds to step S35.

In step S35, the controller 30 determines if the first predetermined inactivity period has elapsed or not. If the first predetermined inactivity period has not elapsed, then the process proceeds to step S36.

In step S36, the controller 30 determines if a signal has been sent to the bicycle electric component being monitored, and/or if a signal has been received by the bicycle electric component being monitored. If the bicycle electric component being monitored has started communicating again, then the process proceeds back to step S35. On the other hand, if the bicycle electric component being monitored is still not communicating, then the process proceeds back to step S32.

In step S35, if the first predetermined inactivity period has elapsed, then the process proceeds to step S37, where the power supply to the bicycle electric component being monitored is reduced so as to place the bicycle electric component being monitored in a first suspend mode. The predetermined suspend period for the first suspend mode is shorter than the first predetermined inactivity period. Here, the controller 30 or a battery supply controller of the power supply FC reduces the electric energy to the bicycle electric component(s) that were determined to be inactive.

In step S38, the controller 30 resets and starts the counter. Then the process proceeds to step S39.

In step S39, the controller 30 determines if the second predetermined inactivity period has elapsed or not. If the second predetermined inactivity period has not elapsed, then the process proceeds to step S40.

In step S40, the controller 30 determines if a signal has been sent to the bicycle electric component being monitored, and/or if a signal has been received by the bicycle electric component being monitored. If the bicycle electric component being monitored has started communicating again, then the process proceeds back to step S32. On the other hand, if the bicycle electric component being monitored is still not communicating, then the process proceeds back to step S41.

In step S39, if the second predetermined inactivity period has elapsed, then the process proceeds to step S41, where the power supply to the bicycle electric component being monitored is reduced so as to place the bicycle electric component being monitored in a second suspend mode. The predetermined suspend period for the second suspend mode is shorter than the second predetermined inactivity period. Here, the controller 30 or a battery supply controller of the power supply FC reduces the electric energy to the bicycle electric component(s) that were determined to be inactive. Next, the process proceeds to step S42.

In step S42, the controller 30 resets and starts the counter. Then the process proceeds to step S43.

In step S43, the controller 30 determines if the second predetermined inactivity period has elapsed or not. If the third predetermined inactivity period has not elapsed, then the process proceeds to step S44.

In step S44, the controller 30 determines if a signal has been sent to the bicycle electric component being monitored, and/or if a signal has been received by the bicycle electric component being monitored. If the bicycle electric component being monitored has started communicating again, then the process proceeds back to step S32. On the other hand, if the bicycle electric component being monitored is still not communicating, then the process proceeds back to step S43.

In step S43, if the second predetermined inactivity period has elapsed, then the process proceeds to step S45, where the power supply to the bicycle electric component being monitored is stopped. Here, the controller 30 or a battery supply controller of the power supply FC turns off the electric energy to the bicycle electric component(s) that were determined to be inactive.

Figure 11:
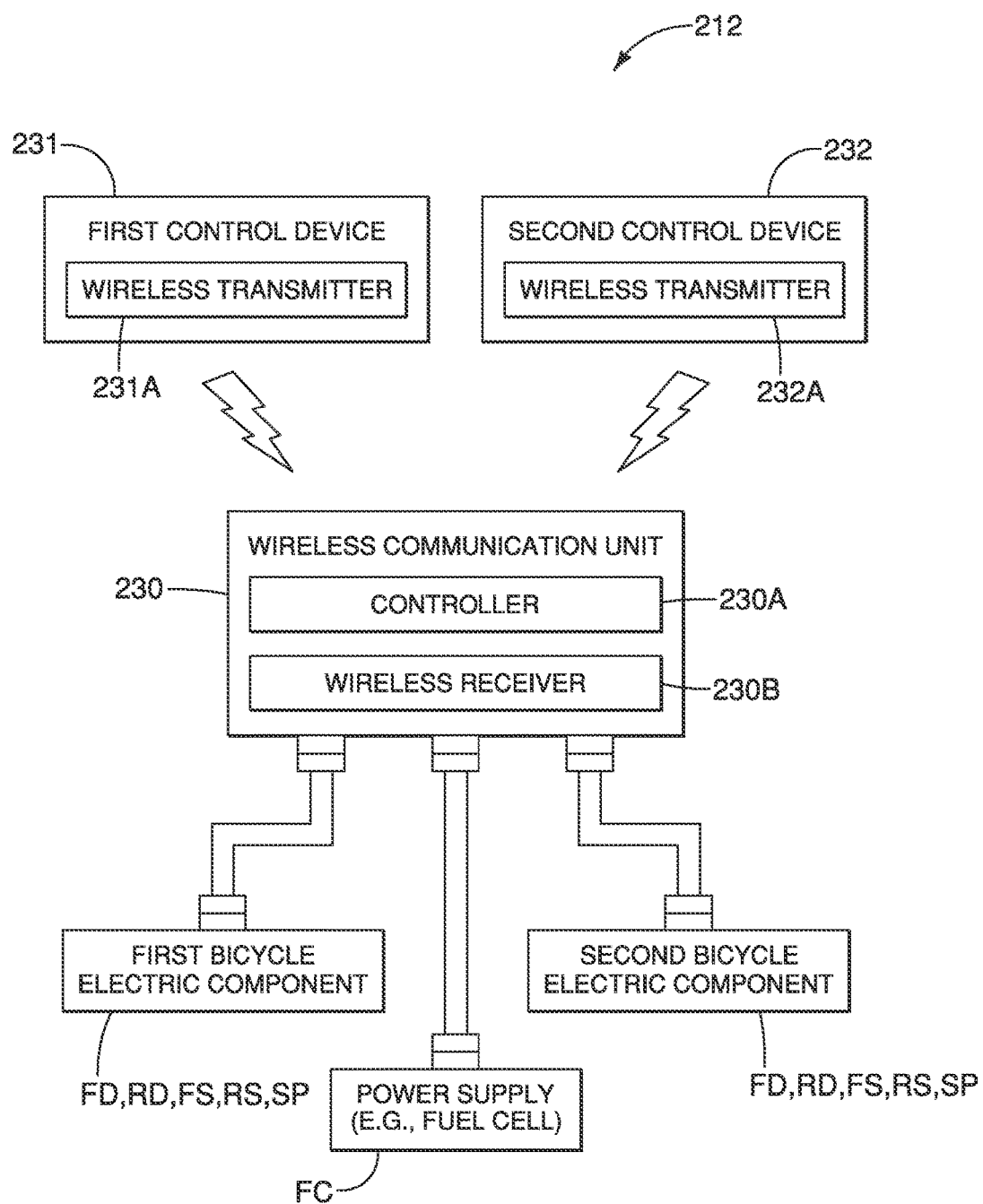
FIG. 11 is a block diagram showing an electric component connection structure of another configuration of the bicycle control system in which the controller, and the manually operated operating devices and the bicycle electric components wirelessly communicate using wireless communications in accordance with a third embodiment.

Referring to now FIG. 11, a bicycle control system 212 is illustrated in accordance with a third embodiment, which uses wireless communication, and can be implemented in the bicycle 1 of FIG. 1 to control the bicycle electric components FD, RD, FS, RS and SP. For the sake of simplicity, only two bicycle electric components are illustrated in the bicycle control system 212 of FIG. 11. Of course, the bicycle control system 212 can be configured with only a single bicycle electric component. The control processes of the flow charts illustrated in FIGS. 8 to 10 are used in this embodiment to converse power in the power supply FC.

Here, the bicycle control system 212 includes a wireless communication unit 230 for transmitting operation signals to the first and second bicycle electric components (two of bicycle electric components FD, RD, FS, RS and SP). The bicycle control system 212 further comprises a bicycle operating device 231 having a wireless transmitter 231A. The bicycle control system 212 further comprises a bicycle operating device 232 having a wireless transmitter 232A.

The wireless communication unit 230 includes a central controller 230A and a wireless receiver 230B. The wireless receiver 230B is programmed to receive a control signal from the wireless transmitter 231A, and output an operation signal to the first bicycle electric component in accordance with the control signal. Likewise, the wireless receiver 230B is programmed to receive a control signal from the wireless transmitter 232A, and output an operation signal to the second bicycle electric component in accordance with the control signal. The wireless receiver 230B is configured to receive the control signals from the first and second operating devices 231 and 232 and output the signals to the controller 230A. While the first and second bicycle electric components both receiving operation signals from the wireless communication unit 230, it will be apparent from this disclosure that the each of first and second bicycle electric components can have a separate and distinct wireless communication unit. Any case, a wireless receiver electrically connected to the first bicycle electric component and to the second bicycle electric component.

The wireless control signals can be radio frequency (RF) signals or any other type of signal suitable for wireless communications as understood in the bicycle field. The wireless receiver 230B is electrically connected to the first and second bicycle electric components (two of bicycle electric components FD, RD, FS, RS and SP) by PLC wires connecting the wireless communication unit 230 to the first and second bicycle electric components (two of bicycle electric components FD, RD, FS, RS and SP). In this way, the control signals from the first and second operating devices 231 and 232 are processes by the central controller 230A and outputted to the first and second bicycle electric components (two of bicycle electric components FD, RD, FS, RS and SP).

The controller 230A is programmed to process the signal and output control signals to the first and second bicycle electric components (two of bicycle electric components FD, RD, FS, RS and SP). In the illustrated embodiment, the controller 230A has a control function to control the electric energy distribution from the power supply FC to the first and second bicycle electric components (two of bicycle electric components FD, RD, FS, RS and SP) such that the controller 230A turns off or reduces the electric energy to the bicycle electric component(s) based on the inactive of the bicycle electric components (two of bicycle electric components FD, RD, FS, RS and SP). Thus, the operation of the controller 230A is the same as the controller 30, discussed above, except that wireless communication is used instead of the electric power lines W1 and W2 for communicating with the first and second operating devices 231 and 232.

Figure 12:
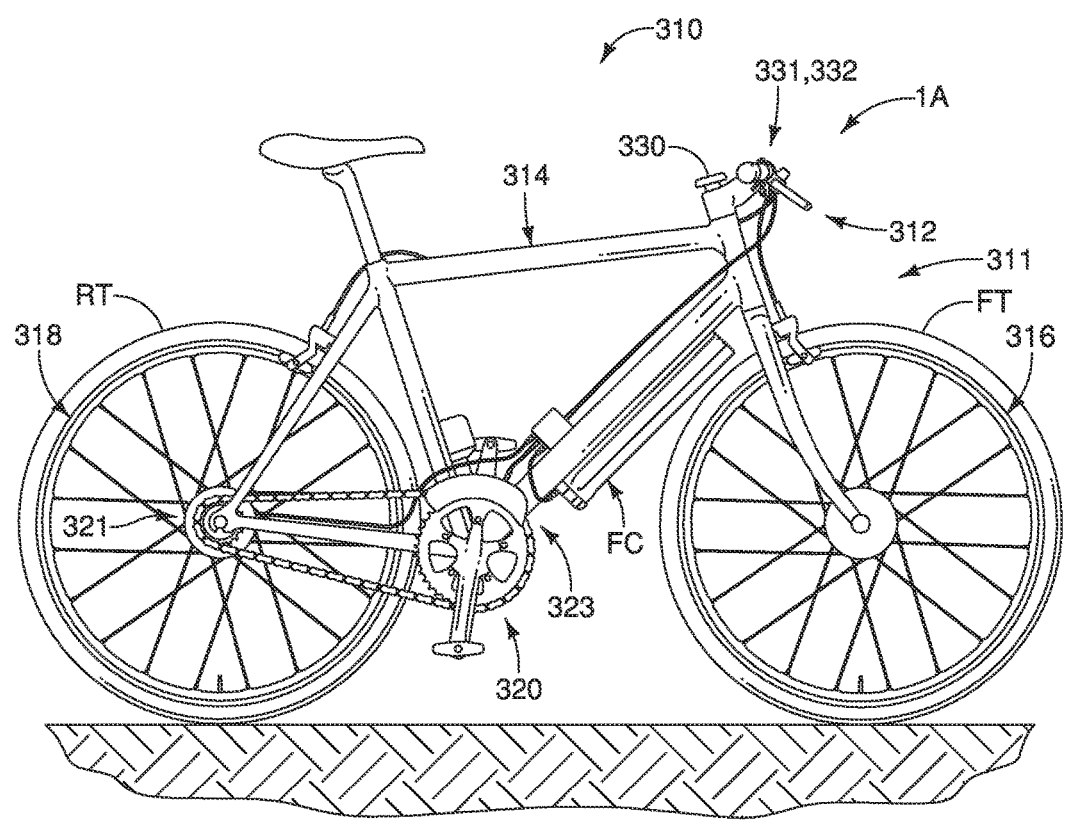
FIG. 12 is a side elevational view of a non-suspension type bicycle that is equipped with a bicycle control system in accordance with a fourth embodiment

Referring to now FIG. 12, a bicycle 1A is illustrated that is equipped with a bicycle control system 312. Here, the bicycle 1A is a non-suspension bicycle that includes a bicycle body 310, a front wheel 316, a rear wheel 318 and a drive train 320. A front tire FT is attached to the front wheel 316 and a rear tire RT is attached to the rear wheel 318. Here in this third embodiment, the rear wheel 318 includes an internally geared hub 321 (i.e., a bicycle electric shifting device). Also here in this third embodiment, the drive train 320 includes a driving unit 323. The driving unit 323 is configured to assist the rider's pedaling of the drive train 320. The internally geared hub 321 and the driving unit 323 are conventional components, and thus will not be described or illustrated in further detail.

The bicycle body 310 includes a bicycle frame set 311 having a frame body 314. The frame body 314 is also provided with a power supply FC (e.g., a hydrogen powered fuel cell as shown or a battery). The power supply FC is electrically connected to the internally geared hub 321 and the driving unit 323. The bicycle control system 312 further comprises a controller 330 and a pair of operating devices 331 and 332 (only visible in FIG. 12). The internally geared hub 321 and the driving unit 323 constitute first and second bicycle electric components that are operated by the controller 330 in response to manual operation of the first and second operating devices 331 and 332. Basically, the controller 330 is programmed to control the distribution of energy from the power supply FC of the bicycle 1A to the internally geared hub 321 and the driving unit 323 in the same manner as the first embodiment. Thus, the controller 330 is programmed with the control processes shown in the flow charts of FIGS. 8 to 10.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle control system. Accordingly, these directional terms, as utilized to describe the bicycle control system should be interpreted relative to a bicycle in an upright riding position on a horizontal surface and that is equipped with the bicycle control system. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control system comprising:
   a power supply;
   a first bicycle electric component electrically connected to the power supply to receive electrical power from the power supply;
   a second bicycle electric component electrically connected to the power supply to receive electrical power from the power supply; and
   a controller programmed
      to monitor an electrical communication of the first bicycle electric component,
      to place the first bicycle electric component in a suspend mode for a predetermined suspend period to reduce electrical power consumption upon the controller determining no electrical communication to or from the first bicycle electric component,
      to stop electrical power from the power supply to the first bicycle electric component upon determining no electrical communication to or from the first bicycle electric component for a first predetermined inactivity period when an operation mode of the first bicycle electric component is in the suspend mode,
      to monitor an electrical communication of the second bicycle electric component,
      to stop electrical power from the power supply to the second bicycle electric component upon determining no electrical communication to or from the second bicycle electric component for a second predetermined inactivity period,
      to individually and independently set the first predetermined inactivity period and the second predetermined inactivity period, and
      to enable a user to individually and independently set the first and second predetermined inactivity periods to desired time periods.

2. The bicycle control system according to claim 1, wherein
   the controller is programmed such that the first predetermined inactivity period of the first bicycle electric component is a different length of time from the second predetermined inactivity period of the second bicycle electric component.

3. The bicycle control system according to claim 1, wherein
   the controller is programmed such that the first predetermined inactivity period of the first bicycle electric component is equal to a length of time from the second predetermined inactivity period of the second bicycle electric component.

4. The bicycle control system according to claim 1, wherein
   the first bicycle electric component is one of a bicycle electric shifting device, a bicycle electric suspension, an electric adjustable seat post and an electric power-assisted motor.

5. The bicycle control system according to claim 1, further comprising
   a bicycle operating device configured to output a control signal to the first bicycle electric component.

6. The bicycle control system according to claim 1, further comprising
   a bicycle operating device having a wireless transmitter; and
   a wireless receiver electrically connected to the first bicycle electric component, the wireless receiver being programmed to receive a control signal from the wireless transmitter and output an operation signal to the first bicycle electric component in accordance with the control signal.

7. The bicycle control system according to claim 1, wherein
   the power supply includes a fuel cell.

8. The bicycle control system according to claim 1, wherein
   the predetermined suspend period is shorter than the first predetermined inactivity period.

9. A bicycle control system comprising:
   a power supply;
   a first bicycle electric component electrically connected to the power supply to receive electrical power from the power supply;
   a second bicycle electric component electrically connected to the power supply to receive electrical power from the power supply; and
   a controller programmed
      to monitor an electrical communication of the first bicycle electric component,
      to place the first bicycle electric component in a first suspend mode that reduces electrical power consumption from the power supply upon determining no electrical communication to or from the first bicycle electric component for a first predetermined inactivity period,
      to place the first bicycle electric component in a second suspend mode that further reduces electrical power consumption from the power supply to a lower consumption rate than in the first suspend mode upon determining no electrical communication to or from the first bicycle electric component for a second predetermined inactivity period when an operation mode of the first bicycle electric component is the first suspend mode,
      to monitor an electrical communication of the second bicycle electric component,
      to place the second bicycle electric component in the first suspend mode upon determining no electrical communication to or from the second bicycle electric component for a third predetermined inactivity period, and
      to place the second bicycle electric component in a second suspend mode upon determining no electrical communication to or from the second bicycle electric component for a fourth predetermined inactivity period that is longer than the third predetermined inactivity period,
      to individually and independently set the first, second, third and fourth predetermined inactivity periods, and
      to enable a user to individually and independently set the first, second, third and fourth predetermined inactivity periods to desired time periods.

10. The bicycle control system according to claim 9, wherein
the controller is programmed such that the first predetermined inactivity period of the first bicycle electric component is a different length of time from the third predetermined inactivity period of the second bicycle electric component.

11. The bicycle control system according to claim 9, wherein
the controller is programmed such that the first predetermined inactivity period of the first bicycle electric component is equal to a length of time from the third predetermined inactivity period of the second bicycle electric component.

12. The bicycle control system according to claim 9, wherein
the first bicycle electric component is one of a bicycle electric shifting device, a bicycle electric suspension, an electric adjustable seat post and an electric power-assisted motor.

13. The bicycle control system according to claim 9, further comprising
a bicycle operating device electrically connected to the first bicycle electric component, the bicycle operating device being configured to output a control signal to the first bicycle electric component.

14. The bicycle control system according to claim 9, further comprising
a bicycle operating device having a wireless transmitter, and
a wireless receiver electrically connected to the first bicycle electric component, the wireless receiver being programmed to receive a control signal from the wireless transmitter and output an operation signal to the first bicycle electric component in accordance with the control signal.

15. The bicycle control system according to claim 9, wherein
the power supply includes a fuel cell.

16. The bicycle control system according to claim 9, wherein
the second predetermined inactivity period is longer than the first predetermined inactivity period.

17. The bicycle control system according to claim 16, wherein
the controller is programmed to stop electrical power from the power supply to the first bicycle electric component upon determining no electrical communication to or from the first bicycle electric component for a next predetermined inactivity period that is longer than the second predetermined inactivity period.

18. A bicycle control system comprising:
a power supply;
a first bicycle electric component electrically connected to the power supply to receive electrical power from the power supply;
a first bicycle operating device electrically connected to the first bicycle electric component;
a second bicycle electric component electrically connected to the power supply to receive electrical power from the power supply;
a second bicycle operating device electrically connected to the second bicycle electric component; and
a controller programmed
to monitor an electrical communication between the first bicycle electric component and the first bicycle operating device and the electrical communication between the second bicycle electric component and the second bicycle operating device, the electrical communication being performed by a power line communication protocol,
to stop electrical power from the power supply to the first bicycle electric component upon determining no electrical communication to or from the first bicycle electric component for a first predetermined inactivity period,
to stop electrical power from the power supply to the second bicycle electric component upon determining no electrical communication to or from the second bicycle electric component for a second predetermined inactivity period,
to individually and independently set the first and second predetermined inactivity periods, and
to enable a user to individually and independently set the first and second predetermined inactivity periods to desired time periods.

* * * * *